United States Patent
Acharya

(10) Patent No.: US 6,459,698 B1
(45) Date of Patent: Oct. 1, 2002

(54) SUPPORTING MAPPING OF LAYER 3 PRIORITIES IN AN INFINIBAND ™ NETWORK

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/881,849

(22) Filed: Jun. 18, 2001

(51) Int. Cl.[7] .......... H04L 12/28; H04L 12/56; G06F 15/173

(52) U.S. Cl. .......... 370/392; 370/401; 370/466; 370/471; 370/474; 370/911; 709/240

(58) Field of Search .......... 370/356, 389, 370/395.31, 395.42, 395.43, 395.5, 401, 402, 466, 467, 469, 471, 474, 903, 908, 911–912, 902, 392; 709/234, 238–244; 711/221, 200, 202–203

(56) References Cited

U.S. PATENT DOCUMENTS 6,199,137 * 3/2001 Aguilar et al.
6,243,787 * 6/2001 Kagan et al.

OTHER PUBLICATIONS

Daniel Cassiday, Infiniband™ Architecture Tutorial, Hot Chips, Aug. 2000, Sun Microsystems, 79 pages.

* cited by examiner

Primary Examiner—William Luther
(74) Attorney, Agent, or Firm—Manelli Denison & Selter PLLC; Leon R. Turkevich

(57) ABSTRACT

A router is configured for sending and receiving data packets on an InfiniBand™ network and acts as a bridge between an IP network and the InfiniBand™ network. The router is configured to receive an Internet Protocol (IP) data packet having an IP header including a type of service (TOS) field having a differentiated services code point indicative of layer 3 priority data of the IP packet. The router includes a mapping table having multiple entries, each entry specifying a differentiated services code point and a corresponding service level. The controller is configured for parsing the TOS field and determining the service level for the differentiated services level. The controller outputs the IP packet on the InfiniBand™ network within an InfiniBand™ packet according to the determined services level.

11 Claims, 4 Drawing Sheets

SUPPORTING MAPPING OF LAYER 3 PRIORITIES IN AN INFINIBAND ™ NETWORK

BACKGROUND OF THE INVENTION

1. Field of the Invention

The present invention relates to an InfiniBand™ router configured for sending and receiving data packets on an InfiniBand™ network.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

The InfiniBand™ Architecture Specification describes a network architecture, illustrated in FIG. 1. The network 10 includes nodes 11, each having an associated channel adapter 12 or 14. For example, the computing node 11a includes processors 16 and a host channel adapter (HCA) 12; the destination target nodes 11b and 11c include target channel adapters 14a and 14b, and target devices (e.g., peripherals such as Ethernet bridges or storage devices) 18a and 18b, respectively. The network 10 also includes routers 20, and InfiniBand™ switches 22.

Channel adapters operate as interface devices for respective server subsystems (i.e., nodes). For example, host channel adapters (HCAs) 12 are used to provide the computing node 11a with an interface connection to the InfiniBand™ network 10, and target channel adapters (TCAs) 14 are used to provide the destination target nodes 11b and 11c with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines in the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

Presently, when a data packet is sent from a TCP-IP network to an InfiniBand™ network, there is no mapping support in the InfiniBand™ network for IP priorities and the packet is simply sent by a router as a raw datagram. Thus, the IP priorities of the packet are not retained.

SUMMARY OF THE INVENTION

When an IP packet is sent from a TCP-IP network to an InfiniBand™ network, there is a need to send from a router, an InfiniBand™ packet according to a determined service level based on a type of service field in the IP packet.

These and other needs are attained by the present invention, where a router is configured for sending and receiving data packets on an InfiniBand™ network. The router is configured to receive an Internet Protocol (IP) data packet having an IP header including a type of service (TOS) field having a differentiated services code point indicative of layer 3 priority data of the IP packet. The router includes a mapping table having multiple entries, each entry specifying a differentiated services code point and a corresponding service level. The controller is configured for parsing the TOS field and determining the service level for the differentiated services level. The controller outputs the IP packet on the InfiniBand™ network within an InfiniBand™ packet according to the determined services level.

Another aspect of the present invention provides a method of outputting an IP packet, received by a router, onto an InfiniBand™ network. The method includes receiving, by the router, an Internet Protocol (IP) data packet having an IP header including a type of service (TOS) field specifying a differentiated services code point value. The TOS field is parsed and the differentiated services code point value is mapped to a determined service level based on the parsed TOS field. The IP packet is outputted on the InfiniBand™ network within an InfiniBand™ packet according to the determined service level.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
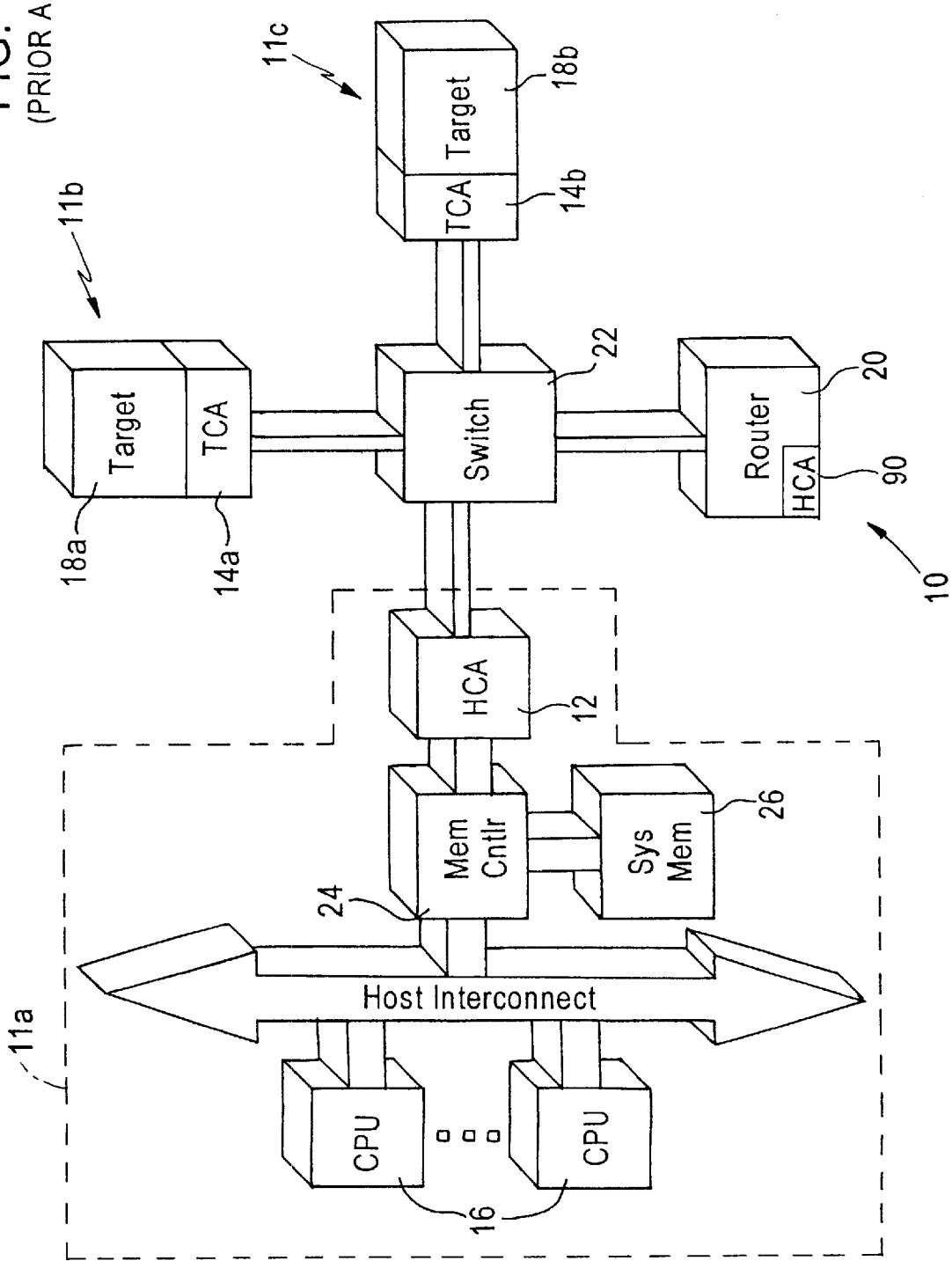
FIG. 1 is a diagram illustrating a conventional network according to the InfiniBand™ Architecture Specification.
Figure 2:
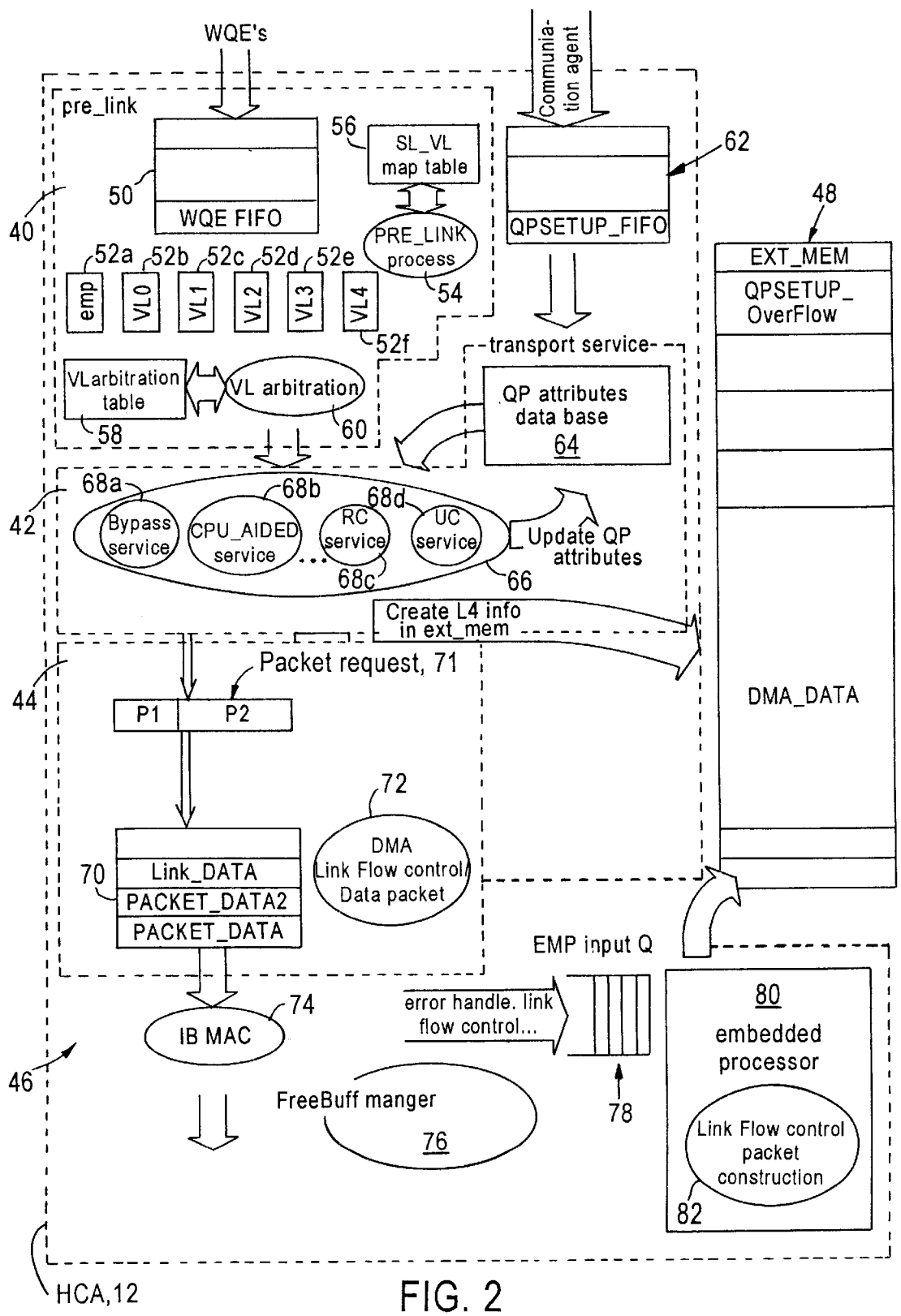
FIG. 2 is a diagram illustrating in detail a host channel adapter of an InfiniBand™ network according to an embodiment of the present invention.

FIG. 2 is a block diagram illustrating a host channel adapter (HCA) 12 configured for generating and transmitting packets according to an embodiment of the present invention. The HCA 12, compliant with the InfiniBand™ Architecture Specification, is implemented in a manner that ensures that hardware resources are efficiently utilized by generating transmit packets according to a priority-based ordering. In addition, the disclosed HCA 12 provides flexibility by enabling embedded processes to be added without disruption of traffic flow. Hence, the HCA 12 can be implemented in an economical manner with minimal complexity relative to conventional implementation techniques.

One problem with conventional arrangements for implementing the HCA 12 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 12 includes a pre-link module configured for determining a priority of received WQEs, and a post-link module configured for preparing a data packet for transmission on the network. The pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

The HCA 12, implemented for example as an application-specific integrated circuit, includes a pre-link module 40, a transport service module 42, a post-link module 44, and a media access control (MAC) module 46. The HCA 12 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 12 is configured for receiving data from a central processing unit (CPU) in the form of work queue elements (WQEs), stored in the WQE FIFO 50. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and teardown of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process, management traffic, or flow control traffic.

The transport service module 42 is configured for managing transport services, including setup, management, and teardown of queue pairs. In particular, the HCA 12 includes a queue pair setup FIFO 62 configured for storing queue pair commands received from a communication management agent. The communication management agent is responsible for setup and teardown of transport connections: the communication management agent communicates with a subnet manager to establish the transport connections (i.e., queue pairs) for the HCA 12. In addition, the communication management agents at each end during connection establishment use a bypass service (described below with respect to bypass service submodule 68a ), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagraam service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively.

The submodule 68 then creates a header pointer (p1) that identifies the location of the transport layer header. The submodule 68 then sends to the post-link module 44 the payload pointer (p2) and the header pointer (p1) as a packet request 71 enabling the post-link module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-link module. Alternately, while writing to the external memory, the CPU may leave blank spaces at the beginning of the data, so that the actual header information that is created within the modules 68 can be stored in the corresponding empty memory space. The pointer passed down to the post-link module 44 could be this pointer which points to the beginning of the frame in the external memory.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52a. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

Figure 3:
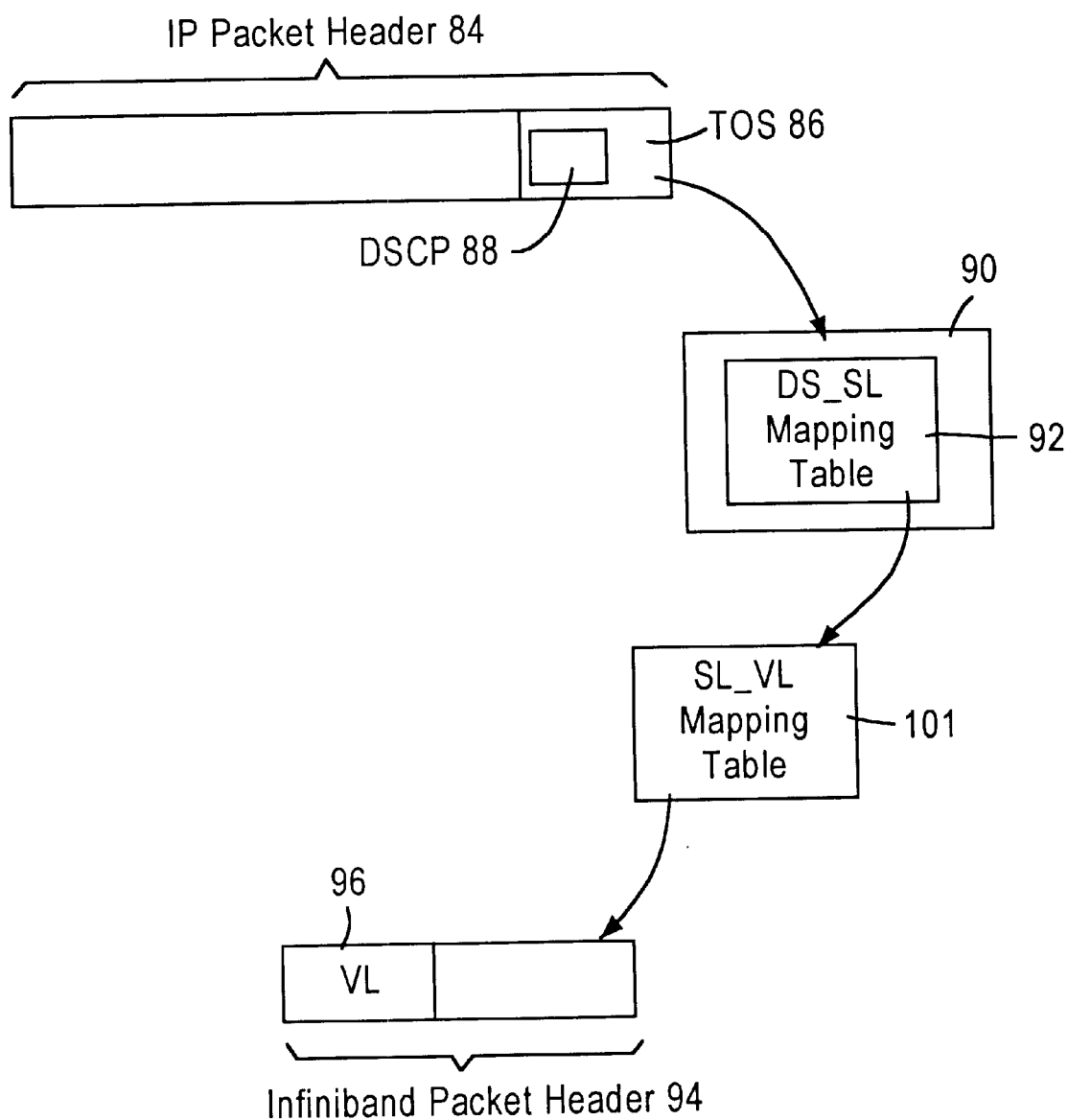
FIG. 3 is a diagram illustrating IP packet conversion to an IB packet while retaining IP priorities.

With reference to FIG. 3, an IP data packet header 84 includes the standard type of service field (TOS) 86 including a differentiated services code point byte 88 which indicates IP (Layer 3) priorities of the packet. In an IP network, when an IP packet is received at router, the code point 88 is parsed and mapped to a corresponding queue. Thus, when a packet is sent, from a node A to a node B, from end to end, all nodes in the network will recognize the code point 88 and give the packet a corresponding priority. Typically, when a data packet is sent from a TCP-IP network to an InfiniBand™ network, there is no layer 3 priority mapping support in the InfiniBand™ network and the packet is simply sent by a router as a raw datagram. Thus, the HP priorities of the packet are not retained.

Figure 4:
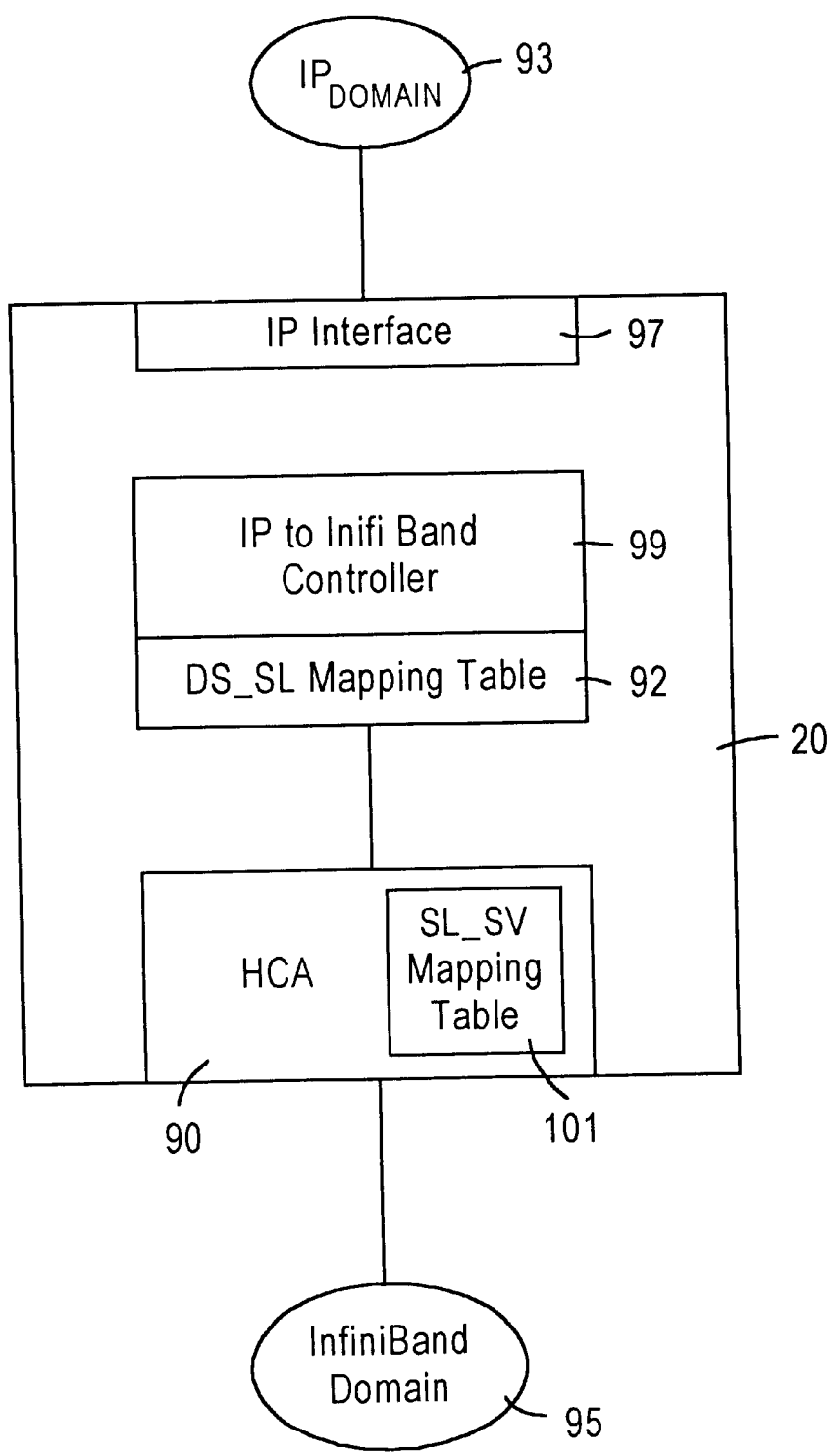
FIG. 4 is a diagram illustrating a router having a DS-SL mapping table to bridge the IP domain and the InfiniBand™ domain.

According to the disclosed embodiment, support is provided in the InfiniBand™ network to recognize the HP priorities in a type of service field of an IP packet and map the TOS field to a service level in the InfiniBand™ network. With reference to FIGS. 2 and 4, router 20 includes an HCA 90 having a differentiated service to service layer (DS_SL) mapping table 92. Application software resides on router 20 for generating the DS_SL mapping table 92. Thus, the DS_SL mapping table 92 bridges the IP domain 93 with the InfiniBand™ domain 95. The router 20 includes an IP interface 97 for connection with the IP domain 93. An IP to InfiniBand™ controller 99 is provided in the router 20. The controller 99 is configured for parsing the TOS field and for determining the service level for the differentiated services code point 88. The controller 99 outputs an IP data packet on InfiniBand™ network within an InfiniBand™ packet according to the determined service level. In particular, the HCA 90 is configured for generating the InfiniBand™ packet based on a request from the controller 99. With reference to FIG. 4, the HCA 90 includes an SL-VL mapping table 101 configured for assigning the InfiniBand™ packet to a prescribed virtual lane based on the determined service level specified in the request. As shown in FIG. 3, an InfiniBand™ packet header 94 is established which includes a virtual lane (VL) field 96 containing packet priority, with VL15 being highest priority and VL0 being lowest priority.

The DS_SL mapping table can be populated by a network processor or packet processor together with content addressable memory containing differentiated services code points 88 and corresponding SL numbers. Alternatively, populating the DS_SL mapping table can be done by management software.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A router configured for sending and receiving data packets on an InfiniBand™ network, the router being configured to receive an Internet Protocol (IP) data packet having an IP header including a type of service (TOS) field having a differentiated services code point value indicative of layer 3 priority data of the IP packet, the router comprising:

a mapping table having multiple entries, each entry specifying a differentiated services code point value and a corresponding service level, and a controller configured for parsing the TOS field and determining the service level for the differentiated services code point value, the controller outputting the IP packet on the InfiniBand™ network within an InfiniBand™ packet according to the determined service level.

2. The router of claim 1, further including a host channel adapter configured for generating the InfiniBand™ packet based on a request from the controller.

3. The router of claim 2, wherein the host channel adapter includes a service level to virtual lane mapping table configured for assigning the InfiniBand™ packet to a prescribed virtual lane based on the determined service level specified in the request.

4. A method of outputting an IP packet, received by a router, onto an InfiniBand™ network, the method comprising:

receiving, by the router, an Internet Protocol (IP) data packet having an IP header including a type of service (TOS) field specifying a differentiated services code point value;

parsing the TOS field and mapping the differentiated services code point value to a determined service level based on the parsed TOS field; and outputting the IP packet on the InfiniBand™ network within an InfiniBand™ packet according to the determined service level.

5. The method of claim 4, further including, prior to outputting step, the step of mapping the service level to a virtual lane and establishing an InfiniBand™ packet header including a virtual lane field that contains priority data relating to the priority data of the IP packet.

6. The method of claim 4, wherein, prior to the parsing step, the method includes populating within the router a differential services code point to service level mapping table with differential service code point values and corresponding service level numbers.

7. A router configured for sending and receiving data packets on an InfiniBand™ network, the router being configured to receive an Internet Protocol (IP) data packet having an IP header including a type of service (TOS) field having a differentiated services code point value indicative of layer 3 priority data of the IP packet, the router comprising:

means for a mapping a differentiated services code point value to a corresponding service level, and means for parsing the TOS field and determining the service level for the differentiated services code point value, and for outputting the IP packet on the InfiniBand™ network within an InfiniBand™ packet according to the determined service level.

8. The router of claim 7, wherein the means for mapping is a mapping table having multiple entries, each entry specifying a differentiated services code point value and a corresponding service level.

9. The router of claim 7, wherein the means for parsing is a controller.

10. The router of claim 9, further including a host channel adapter configured for generating the InfiniBand™ packet based on a request from the controller.

11. The router of claim 10, wherein the host channel adapter includes a service level to virtual lane mapping table configured for assigning the InfiniBand™ packet to a prescribed virtual lane based on the determined service level specified in the request.

* * * * *